United States Patent [19]

Nakai

[11] Patent Number: 5,042,805
[45] Date of Patent: Aug. 27, 1991

[54] SPORTS IMPLEMENTS WITH A LONG HANDLE OR PORTION
[75] Inventor: Yoshinaga Nakai, Takefu, Japan
[73] Assignee: Nisso Ltd., Fukui, Japan
[21] Appl. No.: 460,656
[22] Filed: Jan. 3, 1990
[51] Int. Cl.⁵ .............................................. A63B 53/12
[52] U.S. Cl. ................... 273/80 B; 273/80 R; 273/72 R; 273/73 J; 273/67 A; 273/67 R; 440/101; 114/90; 124/23.1; 280/601; 43/18.1
[58] Field of Search .................. 273/81.5, 80 B, 80 R, 273/72 R, 72 A, 81 R, 80 A, 73 J, 67 A, 67 R; 440/101; 114/90; 124/23.1; 280/601; 43/18.1

[56] References Cited
U.S. PATENT DOCUMENTS

| 780,244 | 1/1905 | Truesdell | 273/72 |
| 1,781,290 | 11/1930 | Margrave | 273/81.5 |
| 4,725,060 | 2/1988 | Iwanaga | 273/80 R |

FOREIGN PATENT DOCUMENTS

| 4326055 | 11/1968 | Japan | 273/80 R |
| 223323 | 2/1943 | Switzerland | 273/80 R |
| 7615 | of 1903 | United Kingdom | 273/80 R |
| 385241 | 12/1932 | United Kingdom | 273/80 |
| 462155 | 3/1937 | United Kingdom | 273/81 |

Primary Examiner—Edward M. Coven
Assistant Examiner—Mark S. Graham

[57] ABSTRACT

A golf club includes a grip, shaft, and head. Within the shaft is disposed a spiral groove in which is disposed a coiled spring formed of a shape-memorizing alloy. Epoxy resin fills the groove and overlies the spring. The spring increases the strength of the shaft.

4 Claims, 14 Drawing Sheets

SPORTS IMPLEMENTS WITH A LONG HANDLE OR PORTION

TECHNICAL FIELD OF THE INVENTION

This invention concerns sports implements with long handles or portions. In particular, this invention may be applied to baseball bats, golf clubs, tennis rackets, badminton rackets, gateball sticks, ice hockey sticks, ski stocks, vaulting poles, boat oars, canoe paddles, yacht poles, ski boards, fencing bayonets, javelins, halberds, archery bows and fishing rods, but is not limited to them. Further, the term "sports implements" should be also understood to comprise the meaning "leisure implements".

DESCRIPTION OF BACKGROUND ART

The above sports implements all have long handles or portions. These long handles or portions must be made strong, light and easy to use. Further, when these implements are used, the long handles or portions deform or bend under external stresses, and are therefore easily damaged. In the case of baseball bats, for example, the bat part which is a long handle sometimes breaks and flies off. The long handle must therefore be made of a flexible but strong material so that said damage does not occur.

In order to satisfy this need, the materials of these long handles or portions conventionally contained tough fibers to strengthen them, or consisted of special metals.

DISCLOSURE OF INVENTION

(1) Technical Problems (Aim of Invention)

The aim of this invention is to confer strength, light-weightness and flexibility on the long handles or portions of sports implements, and by so doing, improve the resilience of said handles or portions, increase their strength with regard to deformation and bending, and prevent part of the handle or portion flying off if it should break.

A further objective of this invention is to impart design appeal to the long handles or portions of sports implements.

(2) Methods of Solving the Above Problems (Characteristics of the Invention)

In order to solve the above technical problems, this invention provides a spiral groove in the long handle or portion of the sports implements, preferably a spiral groove of U-shaped cross-section, and more preferably a spiral line cut of U-shaped cross-section with a sloping angle of approximately 45°, a coiled spring and more preferably a coiled spring of a shape-memorizing alloy being wound in said groove. The groove containing said coiled spring is then filled with an epoxy resin, fluororesin or acrylic resin, and a pigment may also be mixed into the resin if necessary. Said spiral groove may be provided on the outer surface of said long handle or portion, or if the handle or portion is pipe-shaped, the groove may be provided on the inner surface of the handle or portion. Further, a spiral groove may be formed in the long handle or portion, a coiled spring of shape-memorizing alloy would in the groove, and the handle or portion and spring covered by a sheath in a triplex construction.

EXAMPLES

Figure 1:
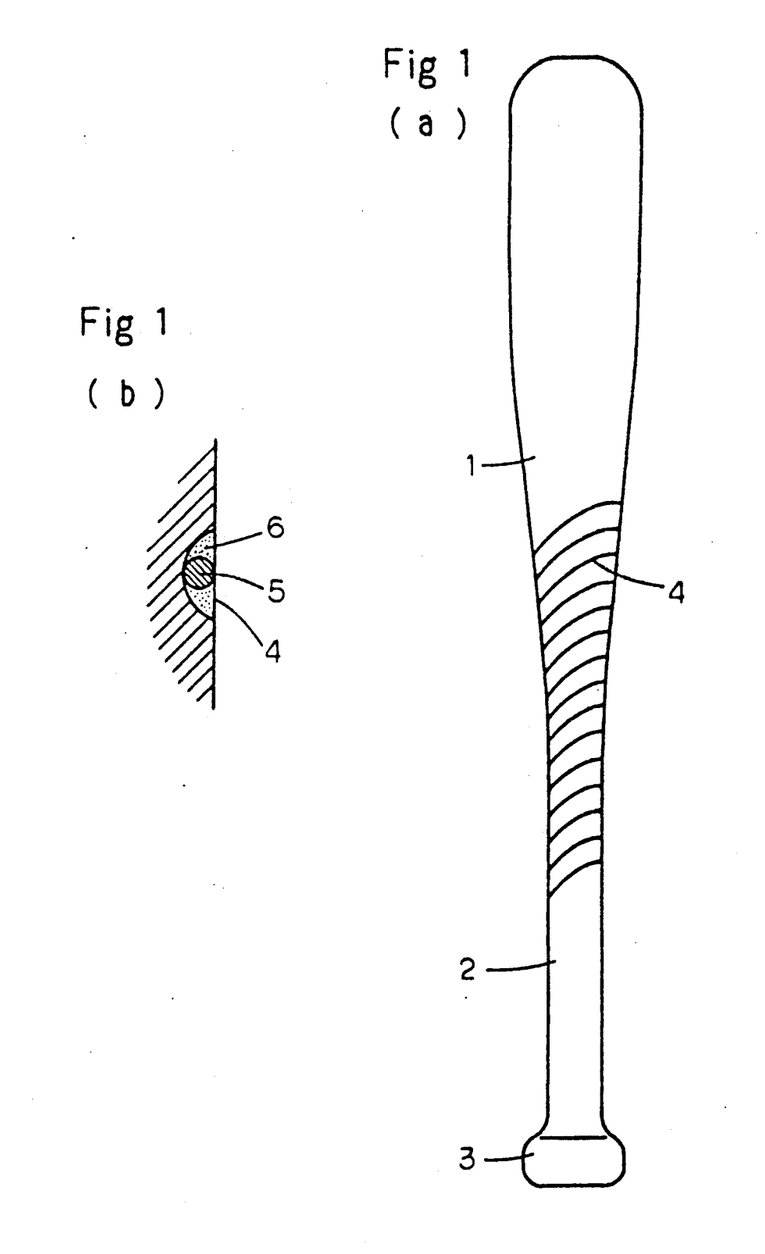
FIG. 1 is a descriptive drawing of a baseball bat according to this invention.

In FIG. 1(a), 1 is a head, 2 is a handle (long handle), and 3 is the grip end. A spiral groove 4 with a slope angle of about 45° is provided in handle 2. FIG. 1(b) is a cross-section of part of handle 2. The U-shaped groove 4 has a gently curving surface, and a coiled spring of shape-memorizing alloy is wound in this groove 4 at a high temperature, e.g. 350°–400° C. In addition, a curing agent and a resin with adhesive properties and strong elasticity, for example an epoxy resin, is painted over the groove and then dried so as to enclose coiled spring 5 in groove 4. A pigment may also be mixed with resin 6 so as to impart a specific color to groove 4.

Figure 2:
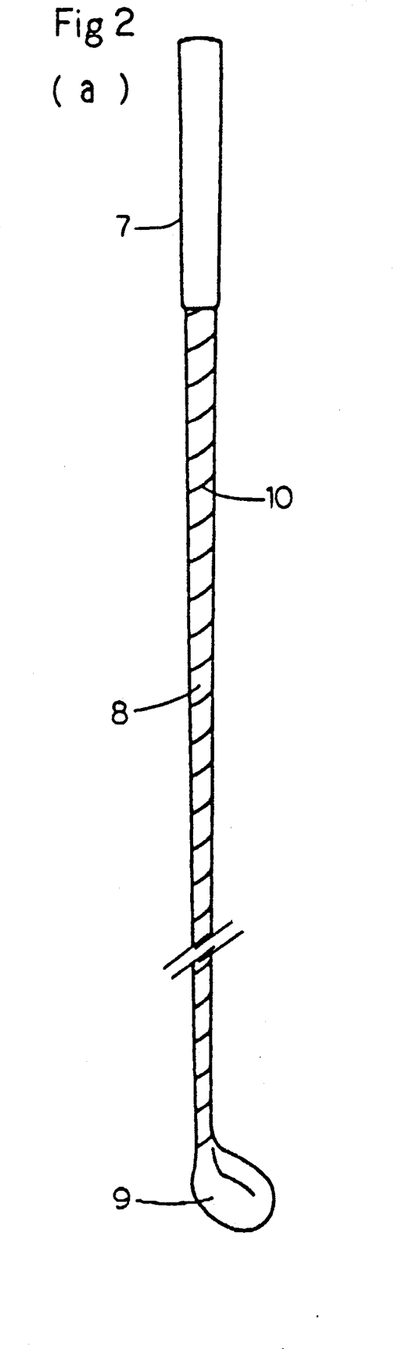
FIG. 2 is a descriptive drawing of a golf club according to this invention.

In FIG. 2(a), 7 is a grip, 8 is a shaft (long handle) and 9 is a head. In shaft 8, there is a spiral groove 10 comprising a smooth curved surface, a U-shaped cross-section and a slope angle of approximately 45°, and a coiled spring of shape-memorizing alloy is wound in the groove 10. FIG. 2(b) is a cross-section of groove 10 of which the optimum dimensions are width L approximately 0.4 mm and depth H approximately 0.2–0.3 mm. According to test results, it has been found that cutting groove 10 from grip 7 to head 9 in a right-handed direction reduces the vibration transmitted to grip 7 when an external shock is received.

Figure 3:
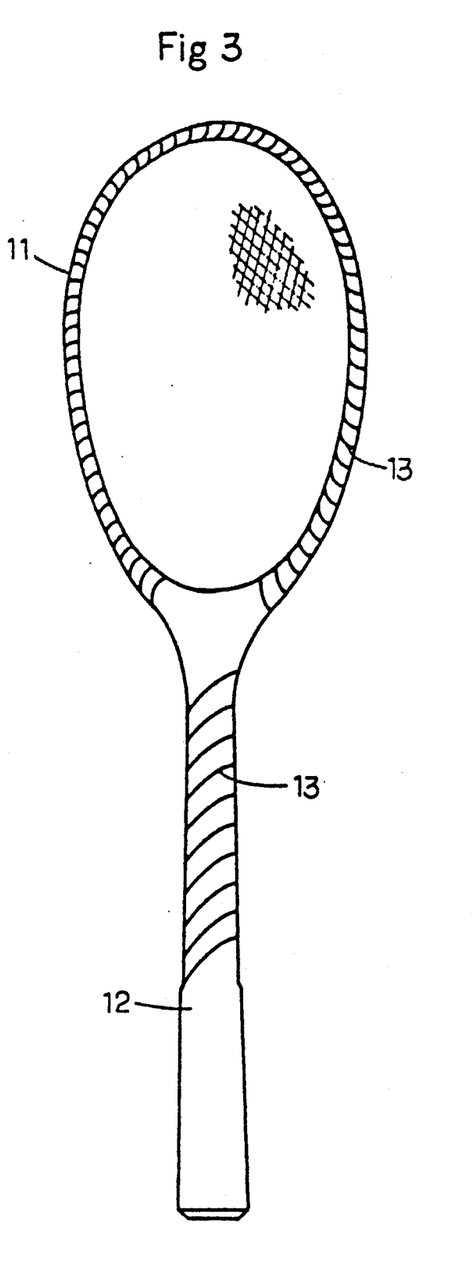
FIG. 3 is a descriptive drawing of a tennis racket according to this invention.

In FIG. 3, 11 is a frame and 12 is a handle (long handle). A spiral groove 14 with a smooth curved surface, U-shaped cross-section and slope angle of approximately 45°, is formed in both frame 11 and handle 12, and a coiled spring of shape-memorizing alloy is wound in this groove 14.

Figure 4:
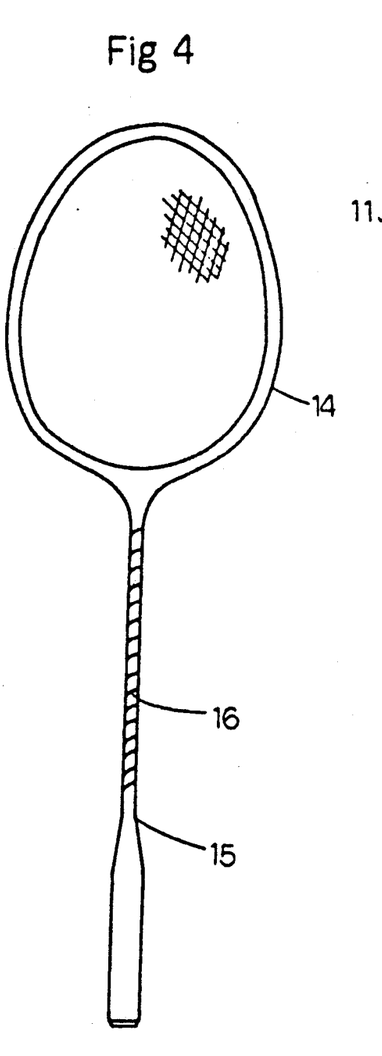
FIG. 4 is a descriptive drawing of a badminton racket according to this invention.

In FIG. 4, 14 is a frame and 15 is a handle (long handle). A spiral groove 16 with a smooth curved surface, U-shaped cross-section and slope angle of approximately 45°, is formed in handle 15, and a coiled spring of shape-memorizing alloy is wound in this groove 16.

Figure 5:
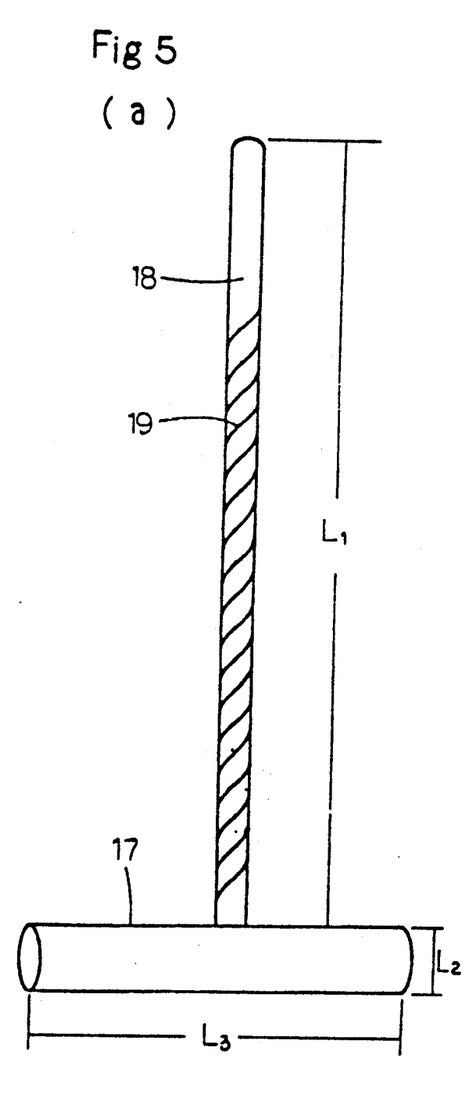
FIG. 5 is a descriptive drawing of a gateball stick according to this invention.

In FIG. 5, 17 is a head and 18 is a shaft (long handle). A spiral groove 19 with a smooth curved surface, U-shaped cross-section and slope angle of approximately 45°, is formed in shaft 18, and a coiled spring of shape-memorizing alloy is wound in this groove 19. Further, the dimensions $L_1$-$L_3$ in the figure are $L_1 = 71$ cm or 80 cm, $L_2 = 4.5$ cm and $L_3 = 24$ cm. FIG. 5(b) is a descriptive drawing of a gateball stick with a slim-type carbon shaft.

Figure 6:
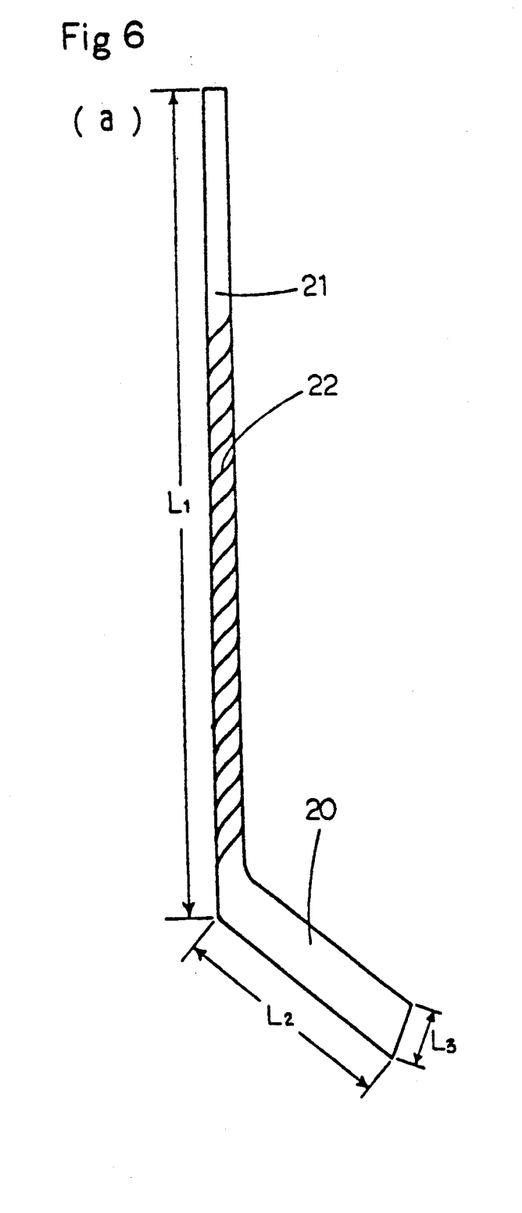
FIG. 6 is a descriptive drawing of an ice hockey stick according to this invention.
Figure 7:
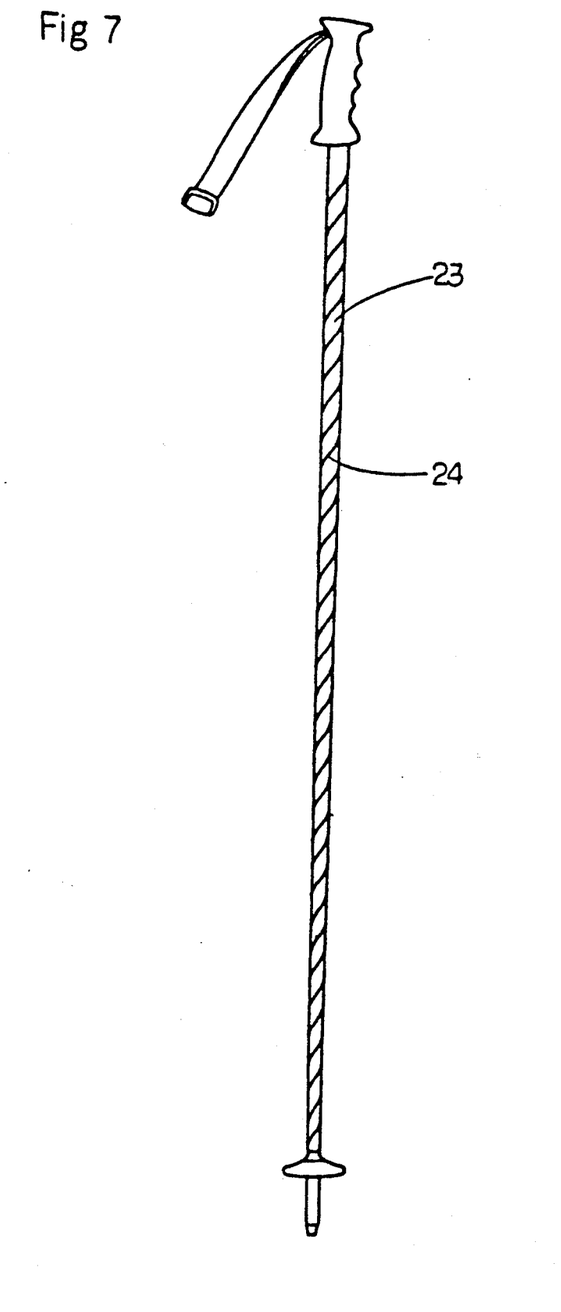
FIG. 7 is a descriptive drawing of a ski stock according to this invention.

In FIG. 6, 20 is a head and 21 is a shaft (long handle). A spiral groove 22 with a smooth curved surface, U-shaped cross-section and slope angle of approximately 45°, is formed in shaft 21, and a coiled spring of shape-memorizing alloy is wound in this groove 22. Further, the dimensions $L_1$-$L_3$ in the figure are $L_1 = L_4 = 147$ cm, $L_2 = 32$ cm, $L_3 = 5$ cm, $L_5 = 71$ cm, $L_6 = 39$ cm and $L_7 = 7.5$ cm. (a) is used by players, and (b) by goalkeepers. In FIG. 7, a spiral groove 24 with a smooth curved surface, U-shaped cross-section and slope angle of approximately 45°, is formed in shaft (long handle) 23, and a coiled spring of shape-memorizing alloy is wound in this groove 24.

Figure 8:
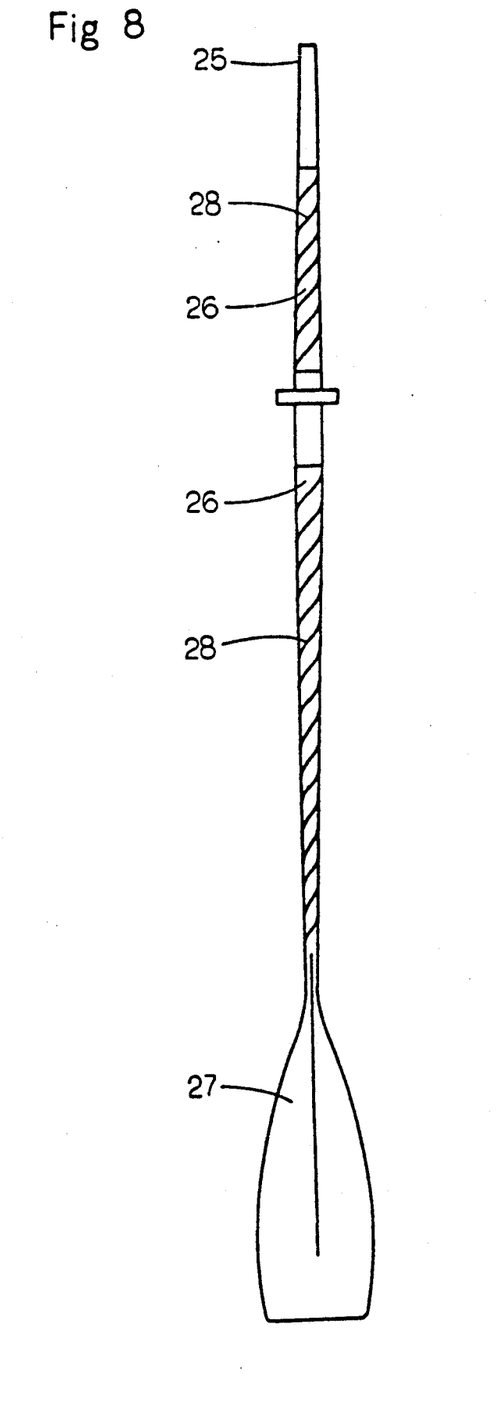
FIG. 8 is a descriptive drawing of a boat oar according to this invention.

In FIG. 8, 25 is a handle, 26 is a shaft (long handle) and 27 is a blade. A spiral groove 28 with a smooth curved surface, U-shaped cross-section and slope angle of approximately 45°, is formed in shaft 26, and a coiled spring of shape-memorizing alloy is wound in this groove 28.

Figure 9:
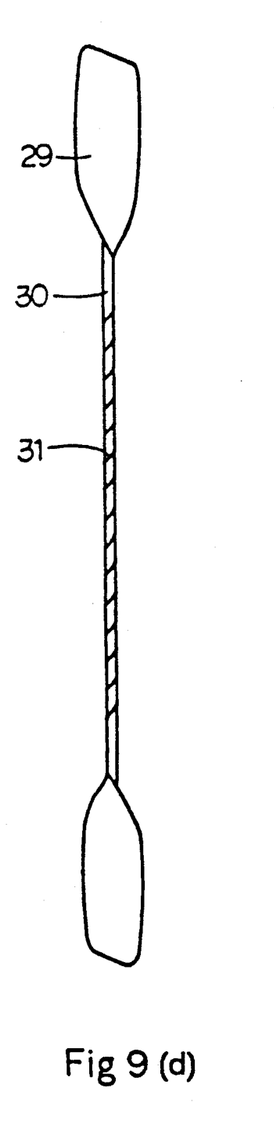
FIG. 9 is a descriptive drawing of a canoe paddle according to this invention.

In FIG. 9, 29 is a blade and 30 is a shaft (long handle). A spiral groove 31 with a smooth curved surface, U-shaped cross-section and slope angle of approximately 45°, is formed in shaft 30, and a coiled spring of shape-memorizing alloy is wound in this groove 31.

Figure 10:
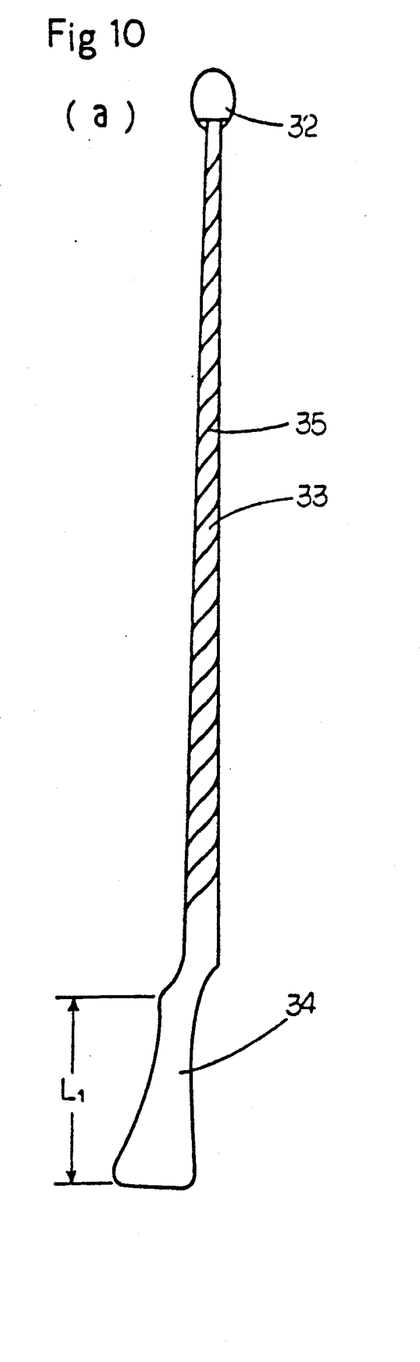
FIG. 10 is a descriptive drawing of a fencing bayonet according to this invention.

In FIG. 10, 32 is a bayonet tip, 33 is a long handle consisting of a blade and ridge, and 34 is a grip. A spiral groove 35 with a smooth curved surface, U-shaped cross-section and slope angle of approximately 45°, is formed in long handle 33, and a coiled spring of shape-memorizing alloy is wound in this groove 35. (a) is a long wooden bayonet of overall length approximately 166 cm and weight approximately 1100 g. (b) is a short wooden bayonet of overall length 133.5 cm. The dimensions $L_1$-$L_2$ in the figure are $L_1 = 25$ cm and $L_2 = 20$ cm.

Figure 11:
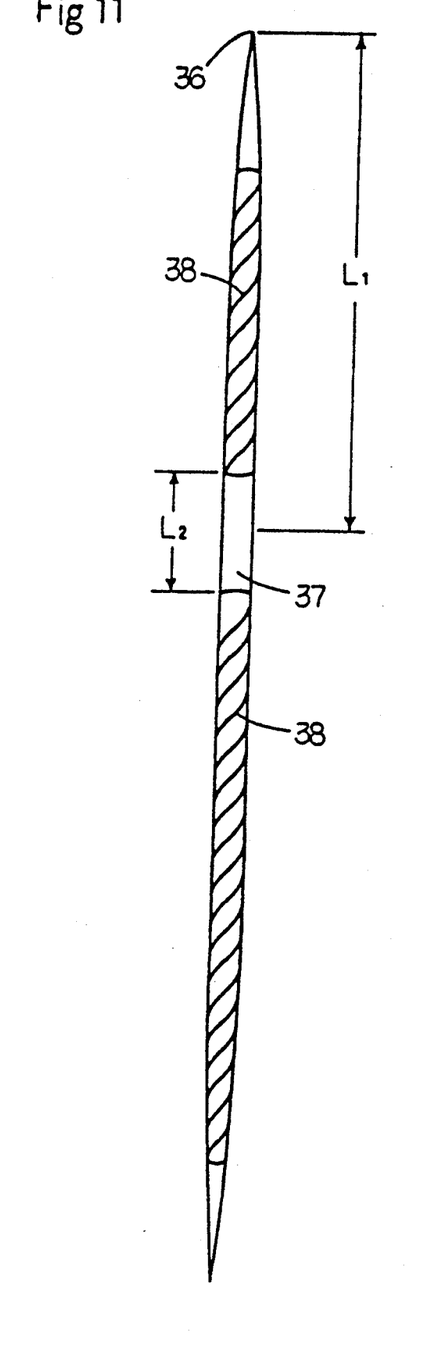
FIG. 11 is a descriptive drawing of a javelin according to this invention.

In FIG. 11, a spiral groove 38 with a smooth curved surface, U-shaped cross-section and slope angle of approximately 45°, is formed in the part excluding the center of gravity 37 and two ends (long handle), and a coiled spring of shape-memorizing alloy is wound in this groove 38. The length $L_1$ from the end 36 to the part including the center of gravity 37 is 90 cm-110 cm for men and 80-95 cm for women; the length $L_2$ of the part including the center of gravity 37 is 15 cm-16 cm for men and 14 cm-15 cm for women; the overall length is 2.6 m-2.7 m for men and 2.2 m-2.3 m for women; while the weight is 800 g for men and 600 g for women.

Figure 12:
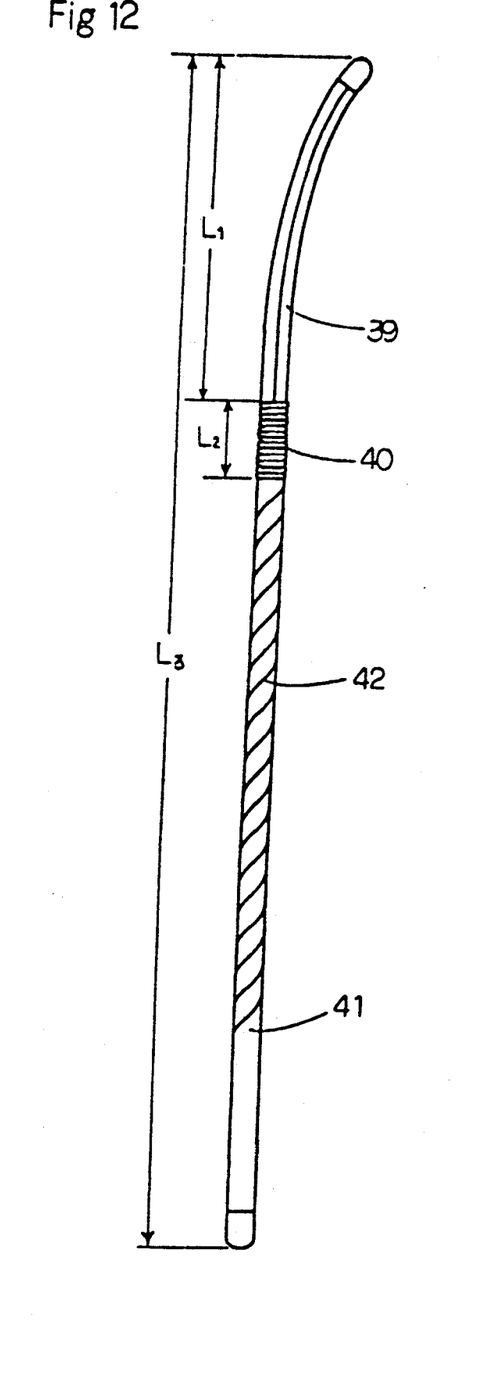
FIG. 12 is a descriptive drawing of a "halberd" according to this invention.

In FIG. 12, 39 is a blade, 40 is a part bound with white vinyl tape, and 41 is a handle (long handle). A spiral groove 42 with a smooth curved surface, U-shaped cross-section and slope angle of approximately 45°, is formed in handle 41, and a coiled spring of shape-memorizing alloy is wound in this groove 42. The length $L_1$ from the end 36 to the part bound with tape 40 is 50 cm, the length $L_2$ of the part bound with tape is 15 cm, and the overall length $L_3$ is 2.1-2.25 m.

Figure 13:
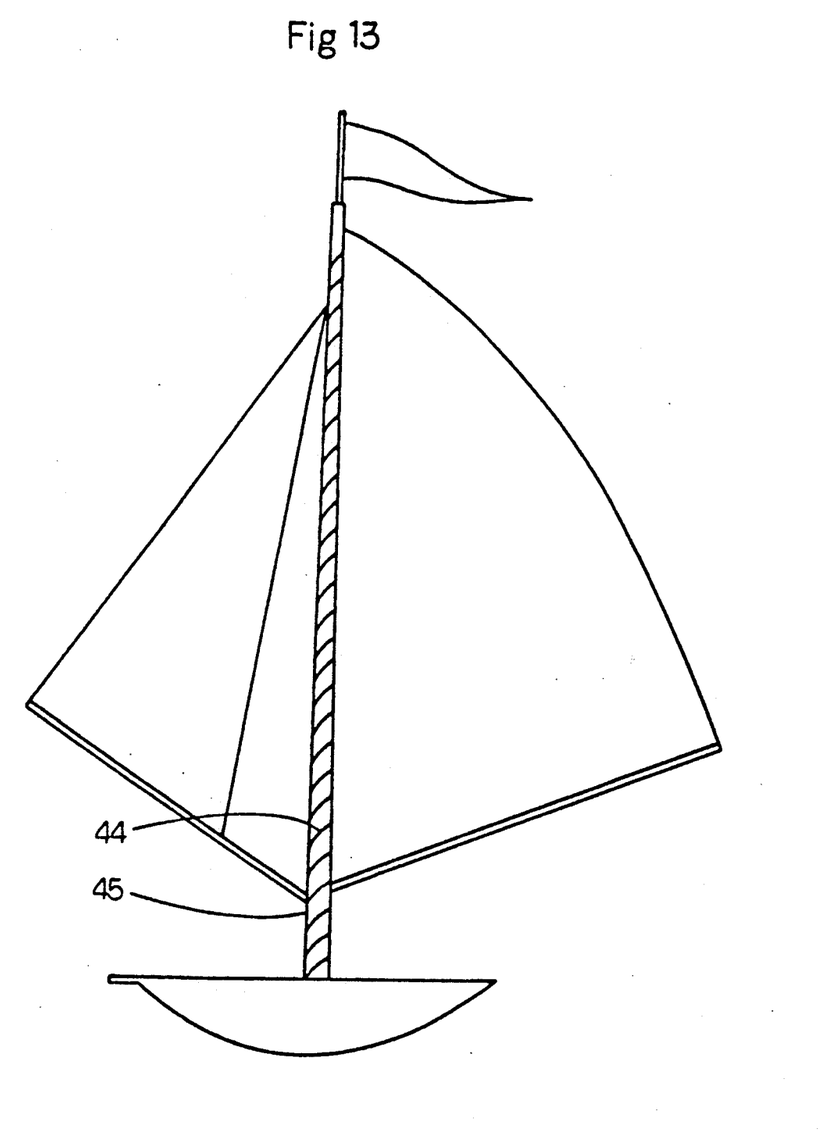
FIG. 13 is a descriptive drawing of a yacht pole according to this invention.

In FIG. 13, a spiral groove 44 with a smooth curved surface, U-shaped cross-section and slope angle of approximately 45°, is formed in pole 43, and a coiled spring of shape-memorizing alloy is wound in this groove 44.

Figure 14:
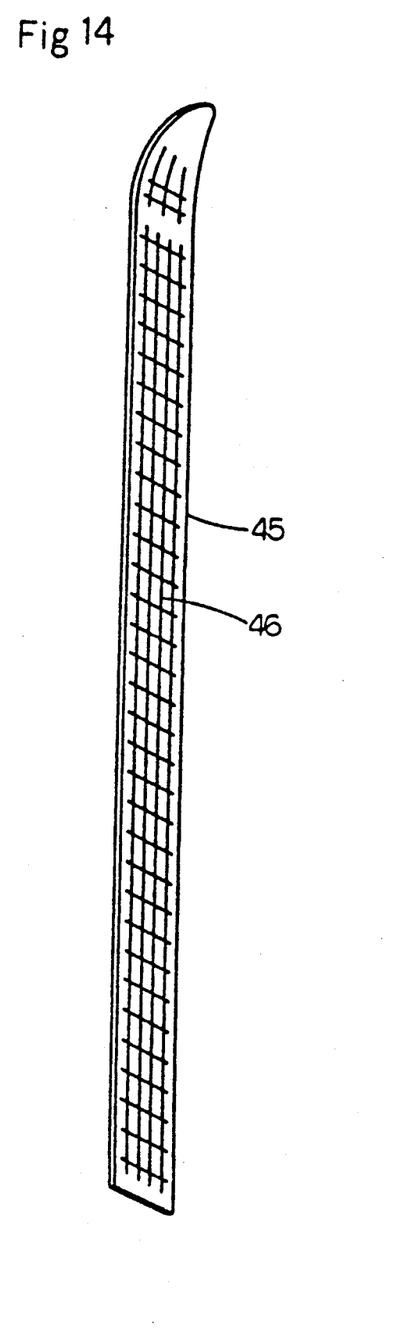
FIG. 14 is a descriptive drawing of a ski board according to this invention.

In FIG. 14, many long rods of shape-memorizing alloy 46 are arranged roughly perpendicularly in a ski board 45 with a flat long portion. It is not however necessary that these pieces of shape-memorizing alloy be arranged perpendicular to one another.

In the examples of FIG. 2-FIG. 14, the coiled spring may also be embedded in the spiral groove by means of resin or the like, as in the example of FIG. 1.

Figure 15:
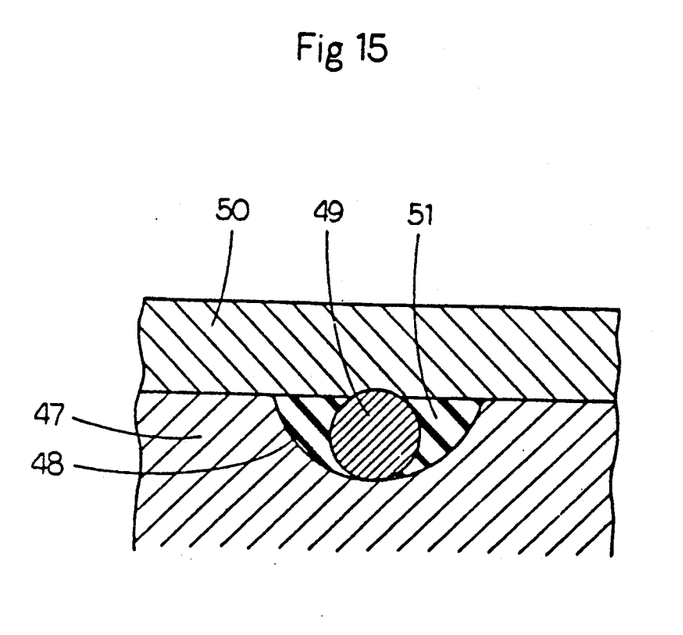

This invention may be implemented in other ways without departing from the spirit and essential conditions of it. In the preferred embodiment shown, for example, said spiral groove is provided on the outer surface of said long handle or portion, but if said long handle or portion is pipe-shaped, it may be provided on the inner surface of said long handle or portion. Further, as shown in FIG. 15, a spiral groove 48 may be provided in long handle or portion 47, a coiled spring of shape-memorizing alloy wound in groove 44, and the groove covered by a sheath 50 in a triplex construction (51 is said resin or the like). Further, this invention is not limited only to the sports implements in the above examples, and may also be applied to other sports implements having a long flat handle or portion. The preferred embodiments described in this specification are therefore given as examples and are by no means exhaustive. The scope of the invention is described in the attached claims, and all modifications within the spirit of the claims shall be understood to be included in the invention.

I claim:

1. In a golf club comprising a grip, a shaft and a head, the improvement comprising a spiral groove formed in said shaft and a coiled spring, formed of a shape-memorizing alloy, disposed in said groove, said groove being filled with an epoxy resin which overlies said coiled spring.

2. The golf club of claim 1, wherein said groove has a depth of approximately 0.2 to 0.3 mm. and a width of approximately 0.4 mm.

3. The golf club of claim 1, wherein said groove forms a right-hand spiral from said grip to said head.

4. The golf club of claim 1, wherein said coiled spring is wound in said groove at a temperature of approximately 350-400 degrees C.

* * * * *